United States Patent
Driesen et al.

(10) Patent No.: US 8,434,060 B2
(45) Date of Patent: Apr. 30, 2013

(54) COMPONENT LOAD PROCEDURE FOR SETTING UP SYSTEMS

(75) Inventors: Volker Driesen, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 55 days.

(21) Appl. No.: 12/857,967

(22) Filed: Aug. 17, 2010

(65) Prior Publication Data

US 2012/0047185 A1    Feb. 23, 2012

(51) Int. Cl.
*G06F 9/44* (2006.01)

(52) U.S. Cl.
USPC ........... 717/107; 717/100; 717/168; 717/174; 707/736; 707/790; 715/200; 706/15; 706/45; 706/62; 700/17; 434/118

(58) Field of Classification Search .................. None
See application file for complete search history.

(56) References Cited

U.S. PATENT DOCUMENTS

| | | | | |
|---|---|---|---|---|
| 6,055,525 | A * | 4/2000 | Nusbickel | 1/1 |
| 6,393,605 | B1 * | 5/2002 | Loomans | 717/121 |
| 7,127,713 | B2 * | 10/2006 | Davis et al. | 717/177 |
| 7,318,216 | B2 * | 1/2008 | Diab | 717/108 |
| 7,565,650 | B2 * | 7/2009 | Bhogal | 717/178 |
| 7,627,860 | B2 * | 12/2009 | Kodosky et al. | 717/141 |
| 2003/0225921 | A1 * | 12/2003 | Hostetter et al. | 709/311 |
| 2005/0066306 | A1 * | 3/2005 | Diab | 717/108 |
| 2005/0091417 | A1 * | 4/2005 | Bhogal | 710/1 |
| 2007/0006203 | A1 * | 1/2007 | Marwinski | 717/166 |
| 2007/0169117 | A1 * | 7/2007 | Hsu et al. | 717/174 |
| 2007/0256048 | A1 * | 11/2007 | Relyea et al. | 717/100 |
| 2008/0141170 | A1 * | 6/2008 | Kodosky et al. | 715/810 |
| 2009/0276767 | A1 * | 11/2009 | Brannen et al. | 717/166 |
| 2010/0138818 | A1 * | 6/2010 | Harrop et al. | 717/153 |
| 2010/0325606 | A1 * | 12/2010 | Sundararajan et al. | 717/105 |

OTHER PUBLICATIONS

Roman Melnyk, "Using DB2 Utilities to clone databases across different platforms", 2004.*

* cited by examiner

*Primary Examiner* — Hung Le
(74) *Attorney, Agent, or Firm* — Mintz, Levin, Cohn, Ferris, Glovsky and Popeo, P.C.

(57) ABSTRACT

Optional components are delivered to a software platform as a database load. A component is deployed to an application server of a first system. The component comprises at least a portion of the software to be delivered as a database load to a second system that implements the software platform. A component export tool in the first system identifies database table structures and database table entries created by the deployment of the component. The component export tool generates a load delivery package based on the identified database table structures and database table entries and then exports the load delivery package to the second system. A component load tool in the second system generates application tables based on the identified database table structures in the shipment package. The database table entries are then imported into the generated application packages in the load delivery package so that the component can be loaded into the software platform. Related apparatus, systems, techniques and articles are also described.

18 Claims, 3 Drawing Sheets

COMPONENT LOAD PROCEDURE FOR SETTING UP SYSTEMS

TECHNICAL FIELD

The subject matter described herein relates to component load procedures for use in setting up complex software systems with optional components.

BACKGROUND

Some enterprise application servers store not only the application data and application customization data in database tables, but also other data, especially the application software shipped by third parties (e.g., vendors, etc.). This approach has several advantages such as having a consistent backup/recovery mechanism for application software and data and is especially useful for applications generating code. On the other hand, depending on how the application software is stored in the database, inclusion of such data in database tables can also create difficulties during installation and update procedures.

A system, where the software is stored in the database can be delivered as a database (DB) load. In such an arrangement, a "delivery system" is set up at the vendor and all components and content that shall be part of the system are deployed to the delivery system database. A "load delivery package" can now be created, containing a description of all table structures and tables content. Using this load delivery package, a customer can setup a system by installing a database, creating the required tables and loading the database content. This approach results in a very fast setup time as there is low processing overhead and the duration is mainly dependent on the DB IO performance.

To ship a system with optional components (a component, where the customer can decide at setup time if it shall be installed or not) the approach described above cannot be used. Only a subset of mandatory components can be deployed at the vendor to the delivery system and exported from the DB and thus be part of the load delivery package.

The optional components a customer wants to deploy on top of the system are treated with the standard deployment mechanism of the system (e.g. with transports for SAP ABAP and deployment for Java). Depending on how the software is stored in the database and which artifacts are shipped, these deployment mechanisms (e.g. transport) are slower compared to the DB load. This is due in part because the DB content of a component is spread over a large set of DB tables and out of these tables, single keys need to be deployed. The effect is, that the DB import is performed row based which is a lot slower than DB load. However, this is still faster compared to required computations upon import.

During deployment (transport) not only do table rows need to be imported, but in addition, programs are executed to compute the DB table entries out of "transport artifacts". As an example for SAP ABAP, a data dictionary definition is imported (e.g. for a table), the structure of the table is computed within the system (depending on the structure of used data elements, domains, structures, etc.) In current SAP delivery this step can take several hours for larger packages. For a logical transport object the "after-import-method" is called. In current SAP delivery this step can also take several hours. That being said, a deployment or transport mechanism can have advantages compared to a DB load such as the ability to ship smaller entities (e.g. deltas, etc.) and the shipment of an application is less dependent on the version of the application server.)

The setup time of a system in which the platform (with the mandatory components) is loaded and the optional components are deployed is therefore longer as compared to a setup of a system where the platform and the other components are part of the load. For example, for an SAP ERP system with Enhancement packages this can be more than 10 hours longer). An additional factor is the error-proneness of deployment, because a large set of tasks need to be performed, compared to the DB load, where only one generic import tool is used.

SUMMARY

In one aspect, optional components are delivered to a software platform as a database load. A component is deployed to an application server of a first system. The component comprises at least a portion of the software to be delivered as a database load to a second system that implements the software platform. A component export tool in the first system identifies database table structures and database table entries created by the deployment of the component. The component export tool generates a load delivery package based on the identified database table structures and database table entries and then exports the load delivery package to the second system. A component load tool in the second system generates application tables based on the identified database table structures in the shipment package. The database table entries are then imported into the generated application packages in the load delivery package so that the component can be loaded into the software platform.

The following describes various implementations which can be incorporated singly or in combination depending on the desired configuration. The first system and the second system can be implemented using a same version of the software platform. The load delivery package can be generated by computing a Data Definition Language Statement (DDL) for the identified database table structures so that the application tables are generated based on the DDL.

It can be determined that at least a portion of a plurality of database artifacts on the first system cannot be mapped to the database table entries such that they require delivery to the second system by deployment. The determining can be based on design-time information specifying that an associated application server requires a deployment and/or it can be based on dynamic information indicating that the second system requires a deployment.

The load delivery package can include a bill of material (BOM) which in turn can be generated by the component export tool. The BOM can include information such as system and/or interface version information for the component and/or system. In addition, the BOM can include an identifier for all objects belonging to the component and to its type. The BOM can specify which objects of the component can be provided within the load delivery package as only a deployable artifact (and the component load tool can read such information).

The component load tool can check a version of the second system to determine if the component has a version greater than a pre-defined version. In some implementations, the component cannot be deployed if the component has a version less than or equal to the pre-defined version. The component load tool can check versions of both of the first and second systems to determine which objects are version dependent. Objects that are not dependent on system versions can be loaded and objects that are dependent on system versions can be deployed. The component load tool can read the BOM to determine, for each item, whether the database table entries require deployment or can be loaded.

In another aspect, optional components are delivered to a software platform as a database load. It is determined that at least one first database artifact that can be delivered as a database load and that at least one second database artifact cannot be delivered as a database load. Thereafter, the at least one first database artifact can be loaded to the software platform and the least one second database artifact can be deployed to the software platform. A component export tool on a first system can determine that the at least one first database artifact can be delivered as a database load and determines that the at least one second database artifact cannot be delivered as a database load. The component export tool can package the database artifacts into a load delivery package for importing by a component load tool on a second system.

In a further aspect, software can be delivered as a database load. A component export tool can access database artifacts within a component of a first system and subsequently compute database table structures and database table entries based on the accessed database artifacts. The component export tool can generate a load delivery package based on the computed database table structures and database table entries and export the load delivery package to a second system. A component load tool in the second system can generate application tables based on the identified database table structures in the load delivery package. The database table entries in the load delivery package can be imported into the generated application tables.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, the current techniques allow loading of a component to a system faster than it would be possible with a deployment. In addition, less modules (especially application specific modules) are required during the load compared to a deployment (and less involved modules can reduce the likelihood of failure). Moreover, the current approach can be used to deploy only the runtime artifacts and not the design-time artifacts (at least for some parts of the system, e.g. the non-public parts, etc.). Typically, the transport modules take a design-time artifact and create a runtime artifact upon import, this way, the module can upon import react on attributes of the system (configuration, software version, customer modification). If this flexibility is not required, only the runtime artifact can be imported.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
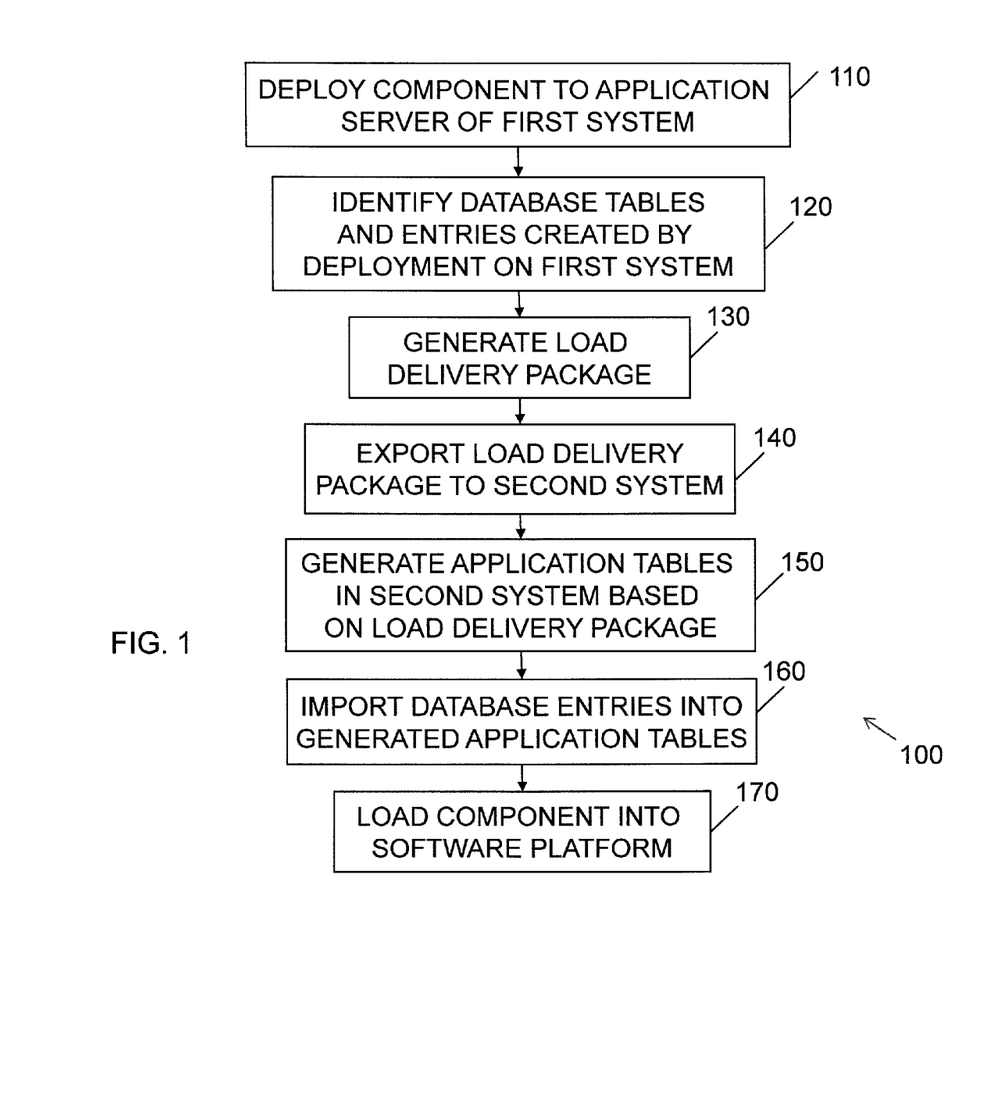
FIG. 1 is a process flow diagram illustrating a process flow diagram for delivering optional components to a software platform as a database load.

FIG. 1 is a processing flow diagram illustrating a method 100 for delivering optional components to a software platform as a database load. A component, at 110, is deployed to an application server of a first system. The component comprises at least a portion of the software to be delivered as a database load to a second system that implements the software platform. A component export tool in the first system, at 120, identifies database table structures and database table entries created by the deployment of the component. The component export tool, at 130, generates a load delivery package based on the identified database table structures and database table entries and then, at 140, exports the load delivery package to the second system. A component load tool in the second system, at 150, generates application tables based on the identified database table structures in the shipment package. The database table entries are, at 160, imported into the generated application packages in the load delivery package so that the component can be loaded, at 170, into the software platform.

Multi-component software products can provide that all components are deployed to customers with only those components being used by the customer being switched on (i.e., activated for use by the customers). With such an arrangement, the product can thus be shipped as a DB load. For the extension of the on-demand strategy, single component products can be built (and such products may be built by multiple vendors). This arrangement results in an offering, where different applications exist, by different vendors having different release cycles. A customer can use several of these products—and even desire to integrate these products.

Figure 2:
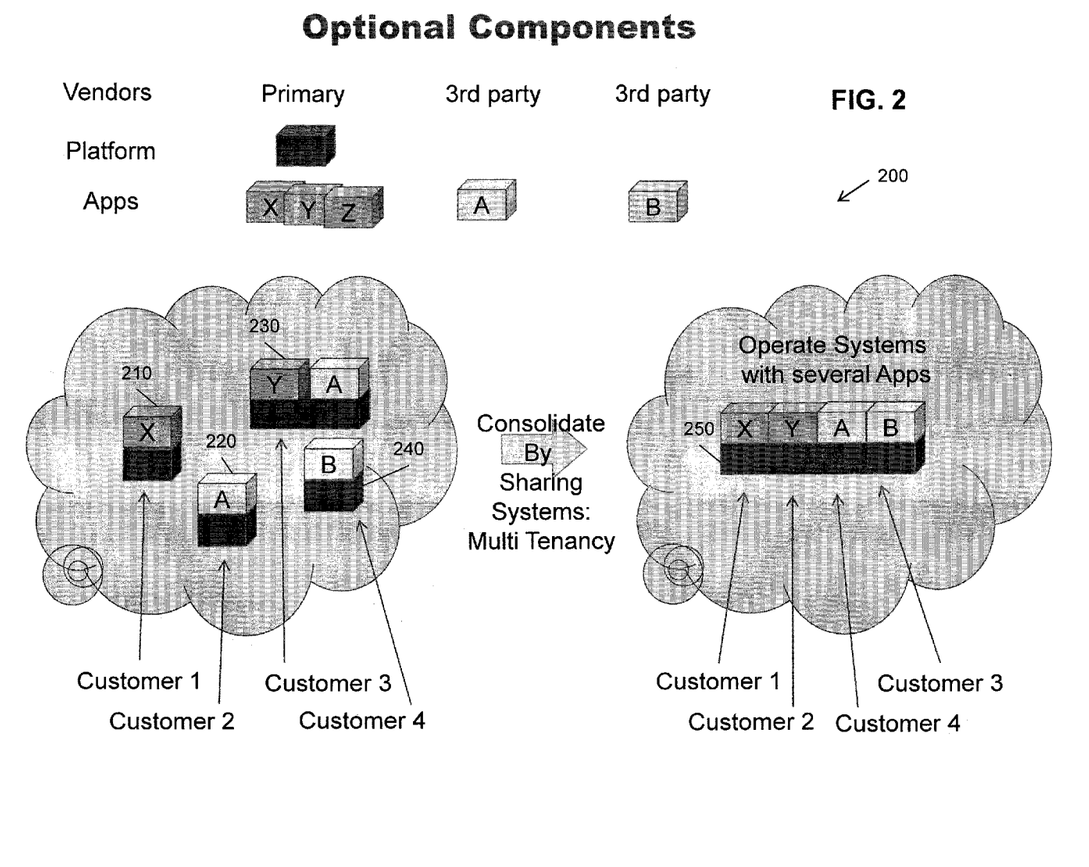
FIG. 2 is a diagram illustrating a multi-tenant system having optional components.

With reference to the diagram 200 of FIG. 2 which illustrates on one hand, a cluster of systems 210, 220, 230, 240 and a single multi-tenant system 250 on the other hand, when a customer desired to integrate multiple products X, Y, Z, A, B from different (or from the same vendor), several options are available. The products X, Y, Z, A, B can be operated separately (that is as individual products or in subsets of the group as a whole), each on a system 210, 220, 230, 240 with a primary platform (e.g., SAP ByDesign™ platform, etc.) and the desired application(s) on top. This arrangement can then be used by several customers (e.g., the application can be used as part of a multi-tenancy computing environments). However, with such an arrangement, integration becomes a cross system integration with additional complexity in lifecycle management (e.g. tenant move, downtime handling, etc.) In addition, for each group of customers using one product, a set of systems need to be operated which can result in a large number of required systems. Alternatively, the products X, Y, Z, A, B, can be co-deployed on a single system 250. As illustrated in FIG. 2, system 250 comprises a primary platform, primary applications X, Y, Z, and third party applications A, B, C. Such an arrangement can be advantageous in that integration scenarios are less complex and the number of systems to manage and operate are reduced (thereby providing a greater level of flexibility for a service provider).

If applications are co-deployed, the deployment duration will increase—not only for the initial setup but also for later upgrades. The current subject matter allows for an individual shipment cycle for different products and the consolidation of systems with different optional components while keeping the deployment duration under control.

Currently, optional components are deployed to a system. During deployment, the artifacts contained in the components shipment package are passed to the respective deployment module of the container holding these kind of artifacts (e.g. ABAP reports, Java servlets, etc.). The container processes the artifacts and stores the resulting objects in database tables.

Figure 3:
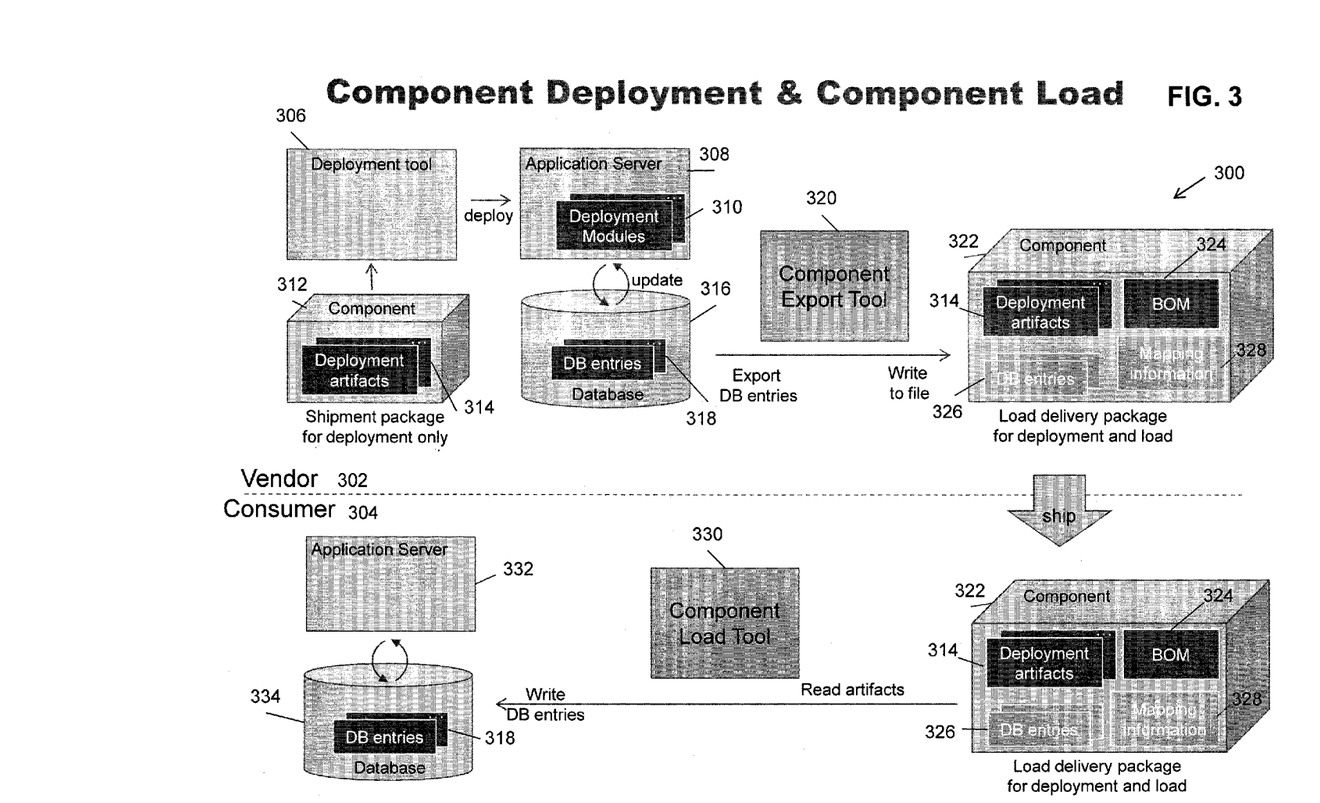
FIG. 3 is a diagram illustrating component deployment and component load from a vendor system to a consumer system.

FIG. 3 is a diagram 300 creation of a load delivery package 322 including DB load data at a vendor system 302 for loading (and in some cases deployment) at a customer system 304. The vendor system 302 can comprise a deployment tool 306, an application server 308 coupled to the deployment tool 306 having one or more development modules 310, a component 312 deployed by the deployment tool 306 that includes one or more deployment artifacts 314 (i.e., database artifacts as a result of the component 312 being deployed, etc.), and a database 316 coupled to the application server 308 having one or more database table entries 318. The deployment tool 306 initiates the creation of the load delivery package 322 for loading and/or deployment.

Using techniques described herein, optional components can be loaded into the database, similarly to a full system load, which can be significantly faster as compared to deployment. To achieve this functionality, an additional production tool, referred to herein as the component export tool 320 can transform deployment artifacts 314 into DB table entries 318. The component export tool 320 generates the load deployment package 322 which is characterizes the component 312 so that it can be loaded and/or deployed to the customer system 304. This load delivery package 322 includes the deployment artifacts 314 from component 312, a bill of materials (BOM) 326 characterizing the contents of the load delivery package 322 and/or the vendor system 302, database table entries 326 corresponding to the database table entries 318 in database 316 but in a transport format, and mapping information 328 which defines the relationship between the deployment artifacts 314 and the DB entries 326. Then, the database table entries 326 which are created during the deployment are identified and exported. These database table entries 326 can then be used to load the load delivery package 322 to the already installed customer system 304. Alternatively, the DB table entries 326 can be computed by the component export tool 320 directly taking the deployment artifacts 314 to be shipped and computing the DB table entries 326 as it would be done during the deployment (in other words the effects of deployment on the vendor system 302 are simulated or otherwise computed without actual deployment).

Upon deployment, a complementary tool in the customer system 304 can be used, referred to herein as the component load tool 330, which can import the DB table entries 326 directly into a corresponding database 334 (with the database table entries 318 being stored therein in the original format) for use by a corresponding application server 332, bypassing the deployment steps. This way, most of the time used by the deployment procedure to compute the DB table entries 326 out of the deployment artifacts 314 can be spared—the time is spent only once during production, and later for the setup of customer system, only the DB import is required.

As stated above, rather than using a standard deployment (e.g. ABAP transport, Java deployment, etc.) to set up customer systems 304, a DB load can be used for both required and optional components. With such an arrangement, the tables and table entries in the DB created by the deployment of a certain component can be identified and delivered directly instead of deploying the component to the customer system 304.

DB table entries 326 (i.e., table entries) created during a deployment of the load delivery package 322 to an application server 332 can be dependent on the application server type. A DB load of a component is thus application server specific. Therefore, in simple implementations, several different load packages can be used for different application server types. Similar variations can be implemented based on the version of the application server 332.

The load should not depend on the individual instance of an application server installation: the database table entries 326 created during the deployment shall not depend on the system instance—they can be the same for all system instances of a certain software version, otherwise the load procedure needs to be adjusted or even cannot be used.

For some DB table entries 326, a load mechanism can require additional tasks during the creation of the load delivery package 322. For example, DB table entries 326 can depend on the host and infrastructure components (host hardware, host operating system, database type, etc.). With this arrangement, preparations are needed in the load (e.g., the component export tool 320 packages the DB table entries 318 into the load delivery package 322 taking into account different hardware, different OS and different databases, etc.). Upon using the load, the component load tool 330 can determine the target system attributes (the hardware, the OS, the DB type) and select from the load archive the correct DB table entries 318 to be loaded into the database 334 of the customer system 304.

For some DB table entries 318 it may even not be possible to ship as a load. In such cases, for example, DB table entries 318 can depend on the vendor system 302 individuality (e.g. system ID, host name, configuration, etc). Deployment artifacts 314 which cannot be shipped as a load can still be created using a deployment-like step. Therefore, in some implementations, a combination of load and deployment can be used.

The component load mechanism thus works best, if either the dependencies on the application server version and system individuality are reduced or the variability of versions and individuality is reduced. Whereas the first is subject to the design of the application server 332, the second is depending on the installed base. For on-demand products the variability of the installations is a lot better under control than for on-premise products. The usage of a component load mechanism can be easier to achieve for on-demand deployment: host hardware, host operating system, database type, application server version and parts of the configuration can be restricted.

One process for optional components using a DB load can comprise the following. First, a load is created so that it can be deployed to an application server 332 or application platform. Thereafter, the component export tool 320 identifies all DB tables and DB table entries 318 created by this components deployment and exports them using low level DB mechanisms to load delivery package 322. The load delivery package 322 is then loaded to the runtime component load tool 330. Application specific tables (i.e., database table entries 326) are created and the corresponding DB table entries 326 can be imported into a running system of the same version as the vendor system 302. The application can then be used by the application server 332.

The following is an example of shipping a table for a component. With a standard deployment, a table definition can be shipped and this table definition is later passed upon deployment to the "persistency manager". This module can compute the table structure and compute a statement for the database to create a table of the defined structure (a DDL statement: Data Definition Language statement). The statement can be passed to the database to create a table of the defined structure. With a load approach, the table definition can be deployed to a system, the table structure can be computed, and the table can be created in the database (and table content is imported). The DB load tool can extract the table from the database (structure definition for the specific DB type (e.g. DDL statement) and content). Upon loading of the application, the table is created in the database by the load tool (the DDL statement is executed) and the content is imported.

As described above, using only a load mechanism can be insufficient in some cases. The deployment of some deployment artifacts 314 to a customer system 304 can result in different DB table entries 318 than the DB table entries 326 brought with the load delivery package 322 (e.g. due to different versions of the platform being used to create the load and import the load, e.g. if the systems individuality is influencing the DB entries). For these entries, the deployment has to be called, for all the other entries the DB load can be used.

Therefore, in some implementations a combination of a load and a deployment can be utilized. A strength of the deployment process for optional components is the robustness against changes in the platform version (and especially internal aspects like the persistency format). If the component load mechanism shall replace deployment, the component load procedure should have the most important capabilities as well—or determine where to use the load and where to "fallback" to the deployment. Some mechanisms regarding same are described below.

The load procedure can be adjusted to a system 302, where only a part of the system 302 can be loaded to a database 334 and another part still needs to be deployed. With such an arrangement, a selection module can be provided to identify, for which deployment artifacts 314 a deployment needs to be used and for which a load can be used. Design-time information as well as dynamic information can be used by the selection module. Design-time information can specify those artifact types where the design of the application server always requires a deployment. As an example, UI elements generated using customer configuration settings. Dynamic information can specify those deployment artifacts 314 for which the decision whether to use a load or a deployment can be dependent on the customer system 304 (the system the deployment shall go to). As an example, deployment artifacts 314 can depend on a public interface version. Here the action depends on the difference in the version of the system 302 used to create the load and the version of the system 304 to which the load shall go. A mapping mechanism can also be provided to identify which database artifact 314 maps to which DB table entries 318. To effect same, the component export tool 320 can add an identifier for all objects belonging to the load delivery package 322 and their type to the bill of material (BOM) 324. The component export tool 320 can add information characterizing which objects on the BOM 324 of the load delivery package 322 are provided within the load delivery package together with their generated artifacts (the DB table entries 326) and an identifier of the generated artifact. The component export tool 320 can add information characterizing which objects on the BOM 324 of the load delivery package 322 are provided within the shipment package only as a deployable artifact (the "design-time information" that certain artifacts always need to be deployed). In addition, the component load tool 330 can read the BOM 324 and identify, for which object on the BOM 324 to call the deployment (according to the object type) and for which object to load the generated artifacts (the DB table entries 326) to the DB directly.

In one example, a load is created and deployed to the vendor system 302. The component export tool 320 writes all objects belonging to the load delivery package 322 to the BOM 324. The component export tool 320 identifies the DB tables entries 326 of the objects in the BOM 324. For those objects, where the DB table entries 326 can be identified, which are created by deploying the load delivery package 322, table entries are written also to the BOM 324, and the original object is marked as "brought with generated artifacts". The component export tool 320 can add information of the system component versions (or interface versions) to the shipment archive.

After the load delivery package 322 is created, then it can be loaded to a runtime. The component load tool 330 can check the version of the customer system 304 to determine if the components are of the same or of a higher than the required version (if one of the components is having a lower version, the load cannot be deployed). The component load tool 330 can create component specific tables and it can read the BOM 324 and determines for each item (or item type) if the DB table entries 326 can be imported or if the deployment needs to be called. If the BOM 324 indicates that the item (item type) is not "brought with generated artifacts", the deployment module is called to deploy the items. If the BOM 324 indicates that there are generated artifacts, the DB entry can be imported.

Certain variations need to be taken into account when there is a load to a higher version of a platform. The process can be adjusted in order to have a higher version of the system upon import. The compatibility of the newer platform version is assumed (e.g. no deletions of fields in interfaces, no changed types, no deleted interfaces, etc.) such that for a new incompatible release of the platform, a new load is created. However, the persistency used by the new platform version can be different. Typically, the persistency format is not considered as "public" and keeping it stable would limit the options for changes in the platform within a release.

To enable loading a component to a platform having a higher version than the version the load had been created with requires additional information about the changes in the interface of the platform. Such additional information can be used to determine if the deployment modules have a new version which use a different persistency and to characterize what, if any, publicly usable system content exists (e.g. re-usable interfaces, types & structures, etc.

If the deployment modules which create the DB entries out of the deployment artifacts change their persistency, a DB load does not work any longer: the DB entries which are created by the new deployment module are different from the ones brought with the shipment package. To enable identifying this situation, the deployment modules can have a version number, which is changed, if the persistency format changes. This version number is packaged by the component export tool 320 with the shipment package. Upon import of the deployment package to a system, the component load tool 330 can compare the version number of the deployment modules with the version number packaged. If the deployment module in the target system is incompatible to the version stored in the shipment package, the component load tool does not load, but deploy the corresponding. For each deployment module, there needs to be a version, which can be read during export and during import time In one example, an ABAP load version changed, FSI (Fast Search Infrastructure) having instead of generated classes per view one generic class configured by meta data). The related process can be to initiate creation of the load. The load delivery package 322 is deployed to the vendor system 302. The component export tool 320 writes all objects belonging to the component to the BOM 324. The component export tool 320 identifies the DB table entries 326 of the objects in the BOM 324. For those objects, where the DB table entries 326 can be identified, which are created by deploying the component, table entries are written also to the BOM 324, and the original object is marked as "brought with generated artifacts". The component export tool 340 writes the system component versions (or interface versions) and the deploy module (or generator) versions the shipment archive.

When loading the load delivery package 322 to a runtime, the component load tool 330 can check the version of the vendor system 302, if the components are of the same or of a higher than the required version. If one of the components has a lower version, the load cannot be deployed. The component load tool 330 can create component specific tables. In addition, the component load tool 330 can read the BOM 324 and determine for each item (or item type) if the DB entries 326 can be imported or if the deployment needs to be called. If the BOM 324 indicates that the item (item type) is not "brought with generated artifacts", the deployment module can be called to deploy the items. If the BOM 324 indicates that there are generated artifacts, the version of the deployment module (the used generators) can be compared to the version which had been used to create the load. If the deploy module is of the same or a compatible version, the DB entry 326 can be imported. If the deploy module is of a higher or incompatible version, the deploy module is called.

Certain operations can be undertaken when there are changes in public content of a system. An application component is typically not a self-contained set of objects. It uses objects part of the public interface of the platform (or other application components)—not only at runtime, but also within the definition of design time objects. As a consequence, a generated runtime object can depend also on the definition of objects of a public interface of the platform (or another component).

Using the standard deployment mechanism, where only the design time object is put on the shipment BOM 324 and the runtime object is generated during the deployment to the target platform system, an application component can be deployed to different versions of a platform having even different versions of objects in the public interface. Upon deployment, the impact of the now different object in the public interface is taken into account by the generator module of the deployed artifact.

A component load procedure can be enabled to handle these kinds of changes as well. Out of the objects in the public interface, the component load tool 330 can determine the subset of objects, which change in version between the platform version V1 the load was created and the platform version V2 the load shall be imported to. For these changed objects in the interface, the dependent objects of the application component are determined and these objects are re-generated (including their dependents). The more stable the platform public content, the less objects to generate.

As an initial matter, objects of the public interface need to be known within the system, including their type. For a new version of the platform, changed objects in the public interface need to be known. With this information, upon load of a package, the subset of objects can be determined, which are part of the interface and have changed between version V1 and V2. The module doing this is part can form part of the component load tool 330 or a module of the system called by the tool. This can be extended by adding objects to the list of changed objects which had been changed by the customer (modification). During the load of the component to a system, only those items need to be generated (out of all items on the BOM 324), which depend on a changed object of the interface. Determining dependent objects is an ability of the generation module. (This is called by the component load tool 330.) For loading one component, it is now required, that there is an option to determine dependent objects within the list of items on the BOM 324.

With such an arrangement, creation of the load can be initiated by deploying the component 312 to the vendor system 302. A component can be deployed to a system. All DB table and table entries 318 created by this components 312 deployment can be identified and exported using low level DB mechanisms. The system component versions (or interface versions) and the generator versions can be written to a container/file. The loading of the component 312 to a runtime can then be initiated. The component load tool 330 can check the version of the system to determine if the components are of the same or of a higher than the required version. If one of the components has a lower version the load cannot be deployed. The component load tool 330 can determine the difference of the interface between versions V1 (version of the platform the export was created on) and V2 (version of the platform to be imported to). Objects in the load depending on the objects in the difference between V1 and V2 are determined (including the objects depending on the dependent). Objects not depending on the difference are loaded. Objects depending on the difference are deployed.

In one example utilizing ABAP. Application tables can be checked to see if the tables depend on data dictionary (DDIC) objects of the platform. If yes, and the objects of the platform changed between the version, the export was done and the version the import is done now, the tables have to be activated again, using the new DDIC objects. New table structure and new DDL statement to create the table can be created. Application specific tables are then created.

In addition, the DB entries can be imported into a running system. If there is a structure change between the export system and the import system (due to another version, e.g. for the application specific tables depending on an interface DDIC object) the import program needs to adjust the structure (e.g. fill new fields with default value, convert data types—e.g. for longer fields). The changes in a platform need to be limited to changes which can be managed by a generic program—no application specific steps may be required, otherwise these would have to run during the import and complicate things again.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for delivering optional components to a software platform as a database load, the method comprising:
   deploying a component to an application server of a first system, the component comprising at least a portion of the software to be delivered as a database load to a second system, the second system implementing the software platform;
   identifying, by a component export tool in the first system, database table structures and database table entries created by the deployment of the component;
   generating, by the component export tool, a load delivery package based on the identified database table structures and database table entries;
   exporting, by the component export tool, the load delivery package to the second system;
   generating, by a component load tool in the second system, application tables based on the identified database table structures in the load delivery package;
   importing, by the component load tool, the database table entries into the generated application tables in the load delivery package;
   loading the component into the software platform;
   determining that at least a portion of a plurality of database artifacts on the first system cannot be mapped to the database table entries and require delivery to the second system by deployment; and
   deploying the at least a portion of the plurality of database artifacts on the first system that cannot be mapped to the database table entries to the second system;
   determining that at least one first database artifact can be delivered as a database load;
   determining that at least one second database artifact cannot be delivered as a database load;
   loading the at least one first database artifact to the software platform; and
   deploying the at least one second database artifact to the software platform.

2. A method as in claim 1, wherein the first system and the second system are implementing a same version of the software platform.

3. A method as in claim 1, wherein generating the load delivery package comprises computing a Data Definition Language Statement (DDL) for the identified database table structures, and wherein the application tables are generated based on the DDL.

4. A method as in claim 1, wherein the determining is based on design-time information specifying that an associated application server requires deployment.

5. A method as in claim 1, wherein the determining is based on dynamic information indicating that the second system requires a deployment.

6. A method as in claim 1, further comprising: adding, by the component export tool, information to a bill of material (BOM) characterizing a system and/or an interface version of the component.

7. A method as in claim 1, further comprising: adding, by the component export tool, an identifier for all objects belonging to the component and to its type to a bill of material (BOM).

8. A method as in claim 7, further comprising: adding, by the component export tool, information to the BOM characterizing which objects of the component are included in the load delivery package.

9. A method as in claim 8, further comprising: adding, by the component export tool, information to the BOM characterizing which objects of the component are provided within the load delivery package as only a deployable artifact.

10. A method as in claim 9, further comprising: reading, by the component load tool, the BOM to identify which objects specified by the BOM require deployment and which objects to load.

11. A method as in claim 8, further comprising: reading, by the component load tool, the BOM to determine, for each item, whether the database table entries require deployment or can be loaded.

12. A method as in claim 1, further comprising: checking, by the component load tool, a version of the second system to determine if the component has a version greater than a pre-defined version.

13. A method as in claim 12, wherein the component cannot be deployed if the component has a version less than or equal to the pre-defined version.

14. A method as in claim 1, further comprising: checking, by the component load tool, a version of the first system and a version of second system to determine which objects are dependent on system versions.

15. A method as in claim 14, further comprising: loading objects that are not dependent on system versions and deploying objects that are dependent on system versions.

16. A method as in claim 1, wherein a component export tool on a first system determines that the at least one first database artifact can be delivered as a database load and determines that the at least one second database artifact cannot be delivered as a database load.

17. A method as in claim 16, wherein the component export tool packages the database artifacts into a load delivery package for importing by a component load tool on a second system.

18. A non-transitory computer program product for delivering components to a software platform as a database load, the computer program product storing instructions, which when executed by at least one data processor, result in operations comprising:

deploying a component to an application server of a first system, the component comprising at least a portion of the software to be delivered as a database load to a second system, the second system implementing the software platform;

identifying, by a component export tool in the first system, database table structures and database table entries created by the deployment of the component;

generating, by the component export tool, a load delivery package based on the identified database table structures and database table entries;

exporting, by the component export tool, the load delivery package to the second system;

generating, by a component load tool in the second system, application tables based on the identified database table structures in the load delivery package;

importing, by the component load tool, the database table entries into the generated application tables in the load delivery package;

loading the component into the software platform; determining that at least a portion of a plurality of database artifacts on the first system cannot be mapped to the database table entries and require delivery to the second system by deployment; and     deploying the at least a portion of the plurality of database artifacts on the first system that cannot be mapped to the database table entries to the second system,     determining that at least one first database artifact can be delivered as a database load;

determining that at least one second database artifact cannot be delivered as a database load;

loading the at least one first database artifact to the software platform; and     deploying the at least one second database artifact to the software platform.

\* \* \* \* \*